United States Patent
Junger et al.

(10) Patent No.: US 12,463,258 B2
(45) Date of Patent: *Nov. 4, 2025

(54) RECONDITIONED BATTERY PACK AND METHOD OF MAKING SAME

(71) Applicant: Spiers New Technologies, Inc., Nichols Hills, OK (US)

(72) Inventors: John Junger, Oklahoma City, OK (US); Bryan Schultz, Oklahoma City, OK (US)

(73) Assignee: Spiers New Technologies, Inc., Nichols Hills, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 18/452,873

(22) Filed: Aug. 21, 2023

(65) Prior Publication Data

US 2024/0136601 A1    Apr. 25, 2024

Related U.S. Application Data

(60) Continuation of application No. 17/328,798, filed on May 24, 2021, now Pat. No. 11,735,779, which is a continuation of application No. 16/297,175, filed on Mar. 8, 2019, now Pat. No. 11,018,380, which is a division of application No. 15/150,054, filed on May 9, 2016, now abandoned.

(51) Int. Cl.
H01M 10/42    (2006.01)
H01M 10/54    (2006.01)

(52) U.S. Cl.
CPC ....... *H01M 10/4207* (2013.01); *H01M 10/54* (2013.01)

(58) Field of Classification Search
CPC ... H01M 10/4207; H01M 10/54; Y02E 60/10; Y02W 30/84
See application file for complete search history.

(56) References Cited

U.S. PATENT DOCUMENTS

| | | | |
|---|---|---|---|
| 6,936,371 | B2 | 8/2005 | Komori et al. |
| 2007/0108946 | A1 | 5/2007 | Yamauchi |
| 2013/0015702 | A1 | 1/2013 | Ito |
| 2016/0028255 | A1 | 1/2016 | Nishikawa |

FOREIGN PATENT DOCUMENTS

EP    2762346    6/2014

*Primary Examiner* — Victoria H Lynch
(74) *Attorney, Agent, or Firm* — DUNLAP CODDING, P.C.

(57) ABSTRACT

A method of recycling battery packs having a plurality of battery units is disclosed. The battery units have positive and negative terminals combined with each other and are supported within a housing. The battery units are separated from battery packs subsequent to the one or more battery packs being judged as being degraded. Each of the battery units is tested with a battery test stand having a fixed resistance load to obtain battery operating data indicative of variable voltage and variable current. The battery units are matched based on the battery operating data to form sets of matching battery units. And, replacement battery packs are formed by connecting positive and negative terminals of the matching battery cells within the sets.

14 Claims, 8 Drawing Sheets

RECONDITIONED BATTERY PACK AND METHOD OF MAKING SAME

INCORPORATION BY REFERENCE

The present patent application is a continuation of U.S. patent application Ser. No. 17/328,798, filed May 24, 2021, which is a Continuation of 16/297,175, filed Mar. 8, 2019 which claims priority to and is a divisional patent application of U.S. patent application Ser. No. 15/150,054, titled "RECONDITIONED BATTERY PACK AND METHOD OF MAKING SAME", filed May 9, 2016, the entire contents of which are hereby incorporated herein by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

BACKGROUND OF THE INVENTION

A rechargeable battery, storage battery, secondary cell, or accumulator is a type of electrical battery which can be charged, discharged into a load, and recharged many times, while a non-rechargeable or primary battery is supplied fully charged, and discarded once discharged. Rechargeable batteries are composed of one or more electrochemical cells. The term "accumulator" is used as it accumulates and stores energy through a reversible electrochemical reaction. Rechargeable batteries are produced in many different shapes and sizes, ranging from button cells to megawatt systems connected to stabilize an electrical distribution network. Several different combinations of electrode materials and electrolytes are used, including lead—acid, nickel cadmium (NiCd), nickel metal hydride (NiMH), lithium ion (Li-ion), and lithium ion polymer (Li-ion polymer).

Rechargeable batteries are used for many applications including powering automobiles, portable consumer devices, light vehicles (such as motorized wheelchairs, golf carts, electric bicycles, and electric forklifts), tools, and uninterruptible power supplies. Emerging applications in hybrid internal combustion-battery and electric vehicles are driving the technology to reduce cost, weight, size, and increase lifetime. Grid energy storage applications use rechargeable batteries for load-leveling, storing electric energy at times of low demand for use during peak periods, and for renewable energy uses, such as storing power generated from photovoltaic arrays during the day to be used at night. Load-leveling reduces the maximum power which a plant must be able to generate, reducing capital cost and the need for peaking power plants.

Rechargeable batteries include a positive active material, a negative active material and in some cases an electrolyte. The positive active material and the negative active material are disposed in the electrolyte. During charging, the positive active material is oxidized, producing electrons, and the negative material is reduced, consuming electrons. These electrons constitute a current flow in a circuit external to the rechargeable battery. The electrolyte may serve as a buffer for internal ion flow between the electrodes, as in lithium-ion and nickel-cadmium cells, or the electrolyte may be an active participant in the electrochemical reaction, as in lead-acid cells.

The energy used to charge rechargeable batteries usually comes from a battery charger using AC mains electricity, or an alternator driven by a separate motive source such as an engine. Regardless of the source of energy, to store energy in a rechargeable battery, the rechargeable battery has to be connected to a DC voltage source. This is accomplished by connecting a negative terminal of the rechargeable battery to a negative terminal of a power source and a positive terminal of the power source to a positive terminal of the rechargeable battery. Further, a voltage output of the power source must be higher than that of the rechargeable battery, but not much higher: the greater the difference between the voltage of the power source and the battery's voltage capacity, the faster the charging process, but also the greater the risk of overcharging and damaging the rechargeable battery.

Battery charging and discharging rates are often discussed by referencing a "C" rate of current. The C rate is that which would theoretically fully charge or discharge the battery in one hour. For example, trickle charging might be performed at C/20 (or a "20 hour" rate), while typical charging and discharging may occur at C/2 (two hours for full capacity).

In some cases, rechargeable battery packs are formed of multiple electrochemical cells (hereinafter "cells") that are connected together in a series or parallel configuration. The capacity within cells of the various rechargeable battery packs vary depending on the discharge rate. Some energy is lost in the internal resistance of cell components (plates, electrolyte, interconnections), and the rate of discharge is limited by the speed at which chemicals in the cell can move about. For lead-acid cells, the relationship between time and discharge rate is described by Peukert's law; a lead-acid cell that can no longer sustain a usable terminal voltage at a high current may still have usable capacity, if discharged at a much lower rate. Data sheets for rechargeable cells often list the discharge capacity on 8-hour or 20-hour or other stated time; cells for uninterruptible power supply systems may be rated at 15 minute discharge.

Battery manufacturers' technical notes often refer to voltage per cell (VPC) for the individual cells that make up the battery. For example, to charge a 12 V lead-acid battery (containing 6 cells of 2 V each) at 2.3 VPC requires a voltage of 13.8 V across the battery's terminals.

There are a number of ways for battery cells to be damaged. Cell reversal, sometimes also called polarity reversal, is one of the most destructive ways in which a battery cell may be damaged. Cell reversal occurs when multiple battery cells are in series, and one battery cell discharges through zero volts while other battery cells maintain a positive voltage. In this situation, the polarity of the discharged cell has reversed. Cell reversal is almost universally caused by a mismatch between the performance characteristics (i.e., capacity) of the battery cells that are in series. Generally, cell reversal causes undesirable and irreversible chemical reactions to occur within the discharged cell, resulting in permanent damage to the discharged cell and possibly a fire.

Many battery-operated devices have a low-voltage cutoff that prevents deep discharges from occurring that might cause cell reversal. With respect to electric vehicles, battery monitoring systems have also been developed to determine when a battery pack is degraded and needs to be replaced. An example of a battery monitoring system is set forth in EP2762346A. Once the battery monitoring system determines that the battery pack is degraded, such battery pack is no longer usable within the electric vehicle. There are a variety of ways in which battery cells within the battery pack can provided a signal indicative of the battery pack being degraded, including a slow internal discharge within the battery pack, cell reversal, or one of the battery cells having a non-standard voltage even though the battery cell has additional life left. The latter can be caused by the battery cells losing capacity at varying rates.

With respect to cell reversal, such can occur to a weakly charged cell even before it is fully discharged. If the battery drain current is high enough, the cell's internal resistance can create a resistive voltage drop that is greater than the cell's forward emf. This results in the reversal of the cell's polarity while the current is flowing.

Batteries that are used repeatedly lose capacity as the number of charge cycles increases. Eventually, such batteries reach the end of their useful life. Many commonly-used types of rechargeable batteries are specified to last between 400 and 1,000 full charge-discharge cycles.

With respect to rechargeable battery packs used in the automotive industry, because the battery packs are used for fuel savings in hybrid electric vehicles and driving range in all electric vehicles, degradation to the battery pack is noticeable and undesirable. The degraded battery packs, however, may have a significant portion of their useful life left after the degraded battery packs have unacceptable performance characteristics for an automotive application. Because of the aforementioned cell reversal issue, in a series battery, the total capacity of the battery pack is limited by the capacity of its weakest cell. The unusable rechargeable battery packs are typically recovered by automotive dealers and then sent to a recycler to extract and re-use the materials, such as nickel, contained within the cells of the rechargeable battery packs. In some cases, the individual cells within the unusable rechargeable battery packs can be separated, tested and used for other purposes as some of the cells still have some capacity and a remaining useful life.

In some cases, attempts have been made to fix the unusuable rechargeable battery packs by testing a voltage and/or resistance of the battery units in the absence of a load, and then replacing a degraded battery unit within the rechargeable battery packs.

It would be advantageous to be able to recycle and re-use a substantial number of the individual battery units within the unusable rechargeable battery pack and to provide replacement battery packs that will function in accordance with a battery management system for a substantial amount of time.

BRIEF DESCRIPTION OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

DETAILED DESCRIPTION OF EXEMPLARY EMBODIMENTS

Figure 1:
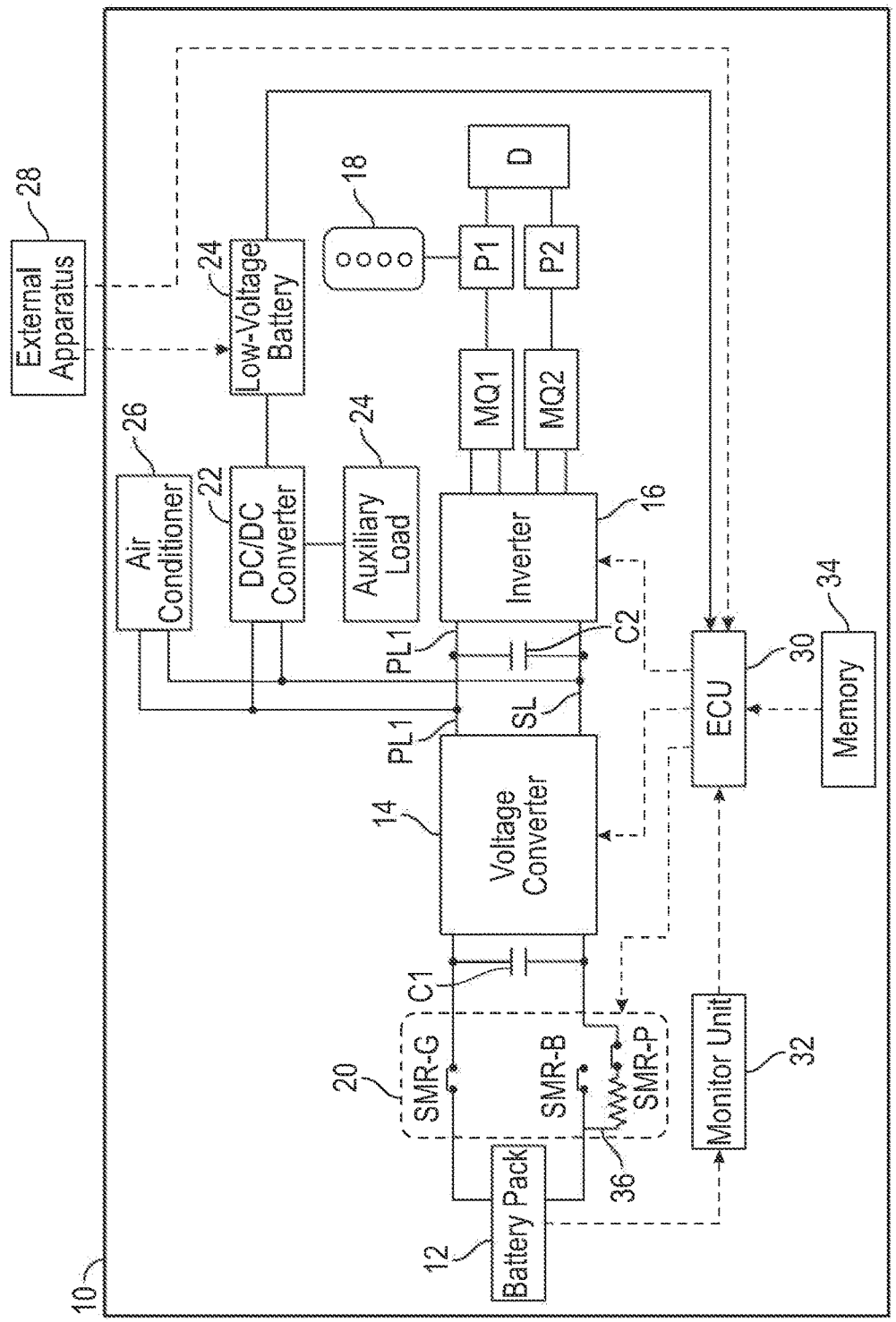
FIG. 1 is a block diagram of an exemplary hardware configuration of part of a vehicle in accordance with an embodiment of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments, or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having," and any variations thereof, are intended to cover a non-exclusive inclusion. For example, a process, method, article, or apparatus that comprises a list of elements is not necessarily limited to only those elements, and may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B is true (or present).

In addition, use of the "a" or "an" are employed to describe elements and components of the embodiments disclosed herein. This is done merely for convenience and to give a general sense of the inventive concepts. This description should be read to include one or at least one and the singular also includes the plural unless it is obvious that it is meant otherwise.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

As used herein, the term "similar acceptable and compatible performance characteristics" is defined as multiple battery units being capable of being coupled together and controllable by a battery management system without being immediately judged as degraded by the battery management system or causing cell reversal of any of the battery units.

The term "battery unit" as used herein means an individual battery cell, or multiple battery cells permanently connected together to form a module.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Embodiments of the present invention will hereinafter be described in detail with reference to the drawings.

Referring now to the drawings, and in particular to FIG. 1, shown therein is a block diagram of an exemplary hardware configuration of part of a vehicle 10 in accordance with an embodiment of the present disclosure. In some embodiments, the vehicle 10 is a conventional vehicle that is described and shown in block diagram form in PCT/JP2011/005399. The following discussion of FIG. 1 was modeled on the description of the vehicle 10 in PCT/JP2011/005399. In FIG. 1, an arrow indicated by a solid line represents the direction of power supply, and arrows indicated by dotted lines represent the directions of signal transmission. The vehicle 10 can be a hybrid car which has a driving system for driving a motor using the output from a battery pack 12 and a driving system with an engine. The vehicle 10 can also be an all-electrically powered vehicle.

Referring to FIG. 1, the vehicle 10 includes the battery pack 12, smoothing capacitors C1 and C2, a voltage converter 14, an inverter 16, a motor generator MG1, a motor generator MG2, a power splitting planetary gear P1, a reduction planetary gear P2, a decelerator D, an engine 18, a relay 20, a DC/DCconverter 22, a low-voltage battery 24, an air conditioner 26, an auxiliary load 28, an electronic control unit ("ECU") 30, a monitor unit 32, and a memory 34.

The battery pack 12 can be provided by using an assembled battery including a plurality of battery units connected in series. Examples of the battery units can include a nickel metal hydride battery, and a nickel cadmium battery. The vehicle 10 also includes a power source line PL1 and a ground line SL. The battery pack 12 is connected to the voltage converter 14 through system main relays SMR-G, SMR-B, and SMR-P which constitute the relay 20. The system main relay SMR-G is connected to a positive terminal of the battery pack 12, and the system main relay SMSR-B is connected to a negative terminal of the battery pack 12. The system main relay SMR-Pand a precharge resistor 36 are connected in parallel with the system main relay SMR-B.

In this embodiment, the system main relays SMR-G, SMR-B, and SMR-P are relays having contacts that are closed when their coils are energized. "ON" of the SMR means an energized state, and "OFF" of the SMR means a nonenergized state.

In the embodiment shown, the ECU 30 turns off all the system main relays SMR-G, SMR-B, and SMR-Pwhile the power is shut off, that is, while an ignition switch is at an OFF position. Specifically, the ECU 30 turns off the current for energizing the coils of the system main relays SMR-G, SMR-B, and SMR-P. The position of the ignition switch is switched in the order from the OFF position to an ON position. The ECU 30 may be a central processing unit ("CPU") or a microprocessing unit ("MPU"), and may include an application specific integrated circuit which performs, based on circuital operation, at least part of processing executed in the CPU or the like. In this embodiment, the ECU 30 starts up by receiving the power supply from the low-voltage battery 24.

Upon start-up of a hybrid system (upon connection to a main power source), that is, for example when a driver steps on a brake pedal and depresses a start switch of push type, the ECU 30 first turns on the system main relay SMR-G. Next, the ECU 30 turns on the system main relay SMR-P to perform precharge.

The precharge resistor 36 is connected to the system main relay SMR-P. Thus, even when the system main relay SMR-P is turned on, the input voltage to the inverter 16 can be slowly increased to prevent the occurrence of an inrush current. When the ignition switch is switched from the ON position to the OFF position, the ECU 30 first turns off the system main relay SMR-B and then turns off the system main relay SMR-G. This breaks the electrical connection between the battery pack 12 and the inverter 16 to enter a power shut-off state. The system main relays SMR-B, SMR-G, and SMR-P are controlled for energization or non-energization in response to a control signal provided by the ECU 30.

The capacitor C1 is connected between the power source line PL1 and the ground line SL and smoothes an inter-line voltage. The DC/DCconverter 22 and the air conditioner 26 are connected in parallel between the power source line PL1 and the ground line SL. The DC/DC converter 22 drops the voltage supplied by the battery pack 12 to charge the low-voltage battery 24 or to supply the power to the auxiliary load 28. The auxiliary load 28 may include an electronic device such as a lamp and an audio for the vehicle, not shown.

The voltage converter 14 increases an inter-terminal voltage of the capacitor C1. The capacitor C2 smoothes the voltage increased by the voltage converter 14. The inverter 16 converts the DC voltage provided by the voltage converter 14 into a three-phase AC current and outputs the AC current to the motor generator MG2. The reduction planetary gear P2 transfers a motive power obtained in the motor generator MG2 to the decelerator D to drive the vehicle. The power splitting planetary gear P1 splits a motive power obtained in the engine 18 into two. One of them is transferred to wheels through the decelerator D, and the other drives the motor generator MG1 to perform power generation.

The power generated in the motor generator MG1 is used for driving the motor generator MG2 to assist the engine 18. The reproduction planetary gear P2 transfers a motive power transferred through the decelerator D to the motor generator MG2 during the deceleration of the vehicle to drive the motor generator MG2 as a power generator. The power obtained in the motor generator MG2 is converted from a three-phase AC current, for example, into a DC current in the inverter 16 and is transferred to the voltage converter 14. In this case, the ECU 30 performs control such that the voltage converter 14 operates as a step-down circuit. The power at the voltage dropped by the voltage converter 14 is stored in the battery pack 12.

The monitor unit 32 obtains the information about the voltage, current, and temperature of the battery pack 12. The monitor unit 32 is formed as a unit integral with the battery pack 12. The voltage value obtained by the monitor unit 32 may be the voltage value of each battery unit (cell) when the secondary batteries constituting the battery pack 12 are Nickel Metal Hydride, Nickel Cadmium or lithium-ion batteries. The voltage value detected by the monitor unit 32 may be the voltage value of each of battery modules (cell groups each including a plurality of battery units connected in series) when the secondary batteries constituting the battery pack 12 are the nickel metal hydride batteries. The temperature of the battery pack 12 may be obtained through a thermistor, not shown.

The memory 34 stores the information about a control upper limit value and a control lower limit value of an electric storage amount for use in charge and discharge control of the battery pack 12. The ECU 30 performs control such that the electric storage amount in the battery pack 12 is maintained within a control range defined by the control upper limit value and the control lower limit value. The ECU 30 suppresses charge when the electric storage amount in the battery pack 12 exceeds the control upper limit value. The ECU 30 prohibits the charge and discharge of the battery pack 12 when the electric storage amount in the battery pack 12 reaches an electric storage amount corresponding to a charge termination voltage higher than the control upper limit value. The state in which the battery pack 12 reaches the charge termination voltage or exceeds the charge termination voltage is referred to as an overcharged state.

The ECU 30 suppresses discharge when the electric storage amount in the battery pack 12 falls below the control lower limit value. The ECU 30 prohibits the charge and discharge of the battery pack 12 when the electric storage amount in the battery pack 12 reaches an electric storage amount corresponding to a discharge termination voltage lower than the control lower limit value. The state in which the electric storage amount in the battery pack 12 reaches a discharge termination voltage or falls below the discharge termination voltage is referred to as an overdischarged state.

Figure 2:
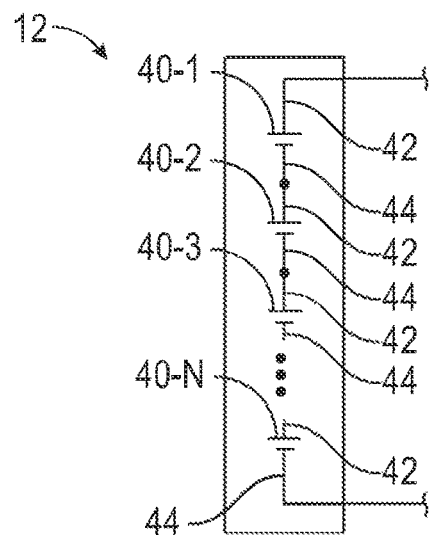
FIG. 2 is a block diagram of an exemplary battery pack shown in FIG. 1 and illustrating multiple battery units connected in series.

As shown in FIG. 2, the battery pack 12 is provided with a plurality of battery units 40. By way of example, four battery units 40 are depicted in FIG. 2 and designated as 40-1, 40-2, 40-3 and 40-n. It should be understood that the battery pack 12 can have any number of battery units 40 and typically will have 28, 30, 38, 40, or 48 battery units 40. The battery units 40 have a positive terminal 42 and a negative terminal 44. The battery units 40 can be combined in a series configuration in which the positive terminal 42 of one of the battery units 40 is connected to the negative terminal 44 of an adjacent battery unit 40. The ECU 30 monitors each of the battery units 40 and the battery pack 12 is indicated as degraded when at least one of the battery units 40 of the battery pack 12 is in the overcharged state or in the overdischarged state. The ECU 30 calculates the electric storage amount based on the information about the voltage, current, and temperature obtained by the monitor unit 32, and when the ECU 30 determines that at least one of the battery units included in the battery pack 12 is in the overcharged or overdischarged state, the ECU 30 turns off the system main relay SMR-B and the system main relay SMR-G to break the electrical connection between the battery pack 12 and the inverter 16.

Alternatively, when the ECU 30 determines that at least one of the cells included in the battery pack 12 is in the overcharged or overdischarged state, the ECU 30 may prohibit the charge and discharge of the battery pack 12 by controlling the inverter 16 without turning off the system main relay SMR-B and the system main relay SMR-G. This causes the vehicle 10 to enter a running disabled state in which the running using the battery pack 12 is disabled. The ECU 30 is provided at a position separate from the battery pack 12. Alternatively, the ECU 30 and the battery pack 12 may be formed as a unit.

Figure 3:
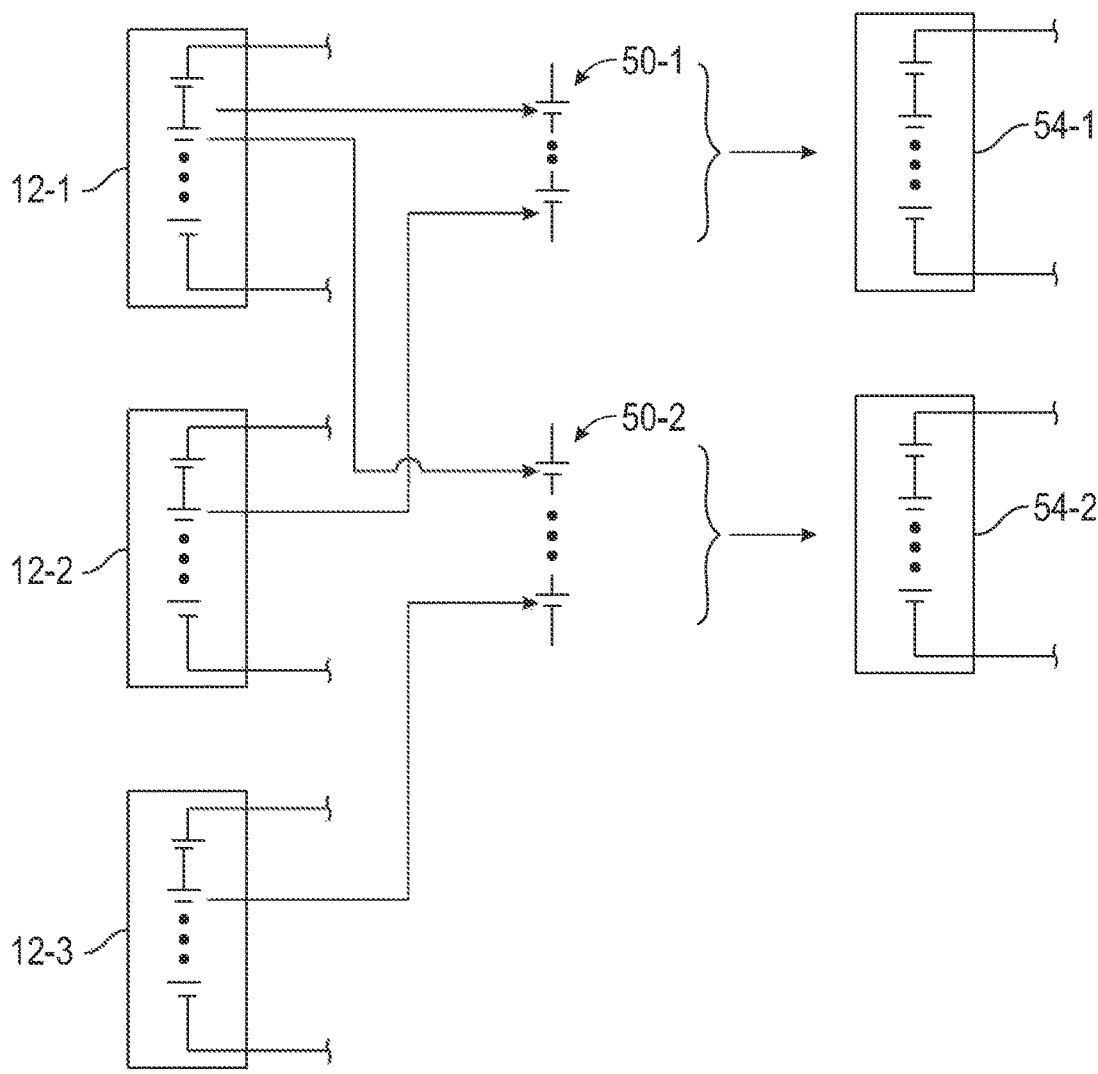
FIG. 3 is a process flow diagram showing a methodology for recycling battery packs that have been previously judged as degraded into a replacement battery pack in accordance with embodiments of the present disclosure.

Shown in FIG. 3 are three battery packs 12 that are designated with the reference numerals 12-1, 12-2 and 12-3. The battery packs 12-1, 12-2 and 12-3 were a part of different vehicles 10 and have been judged as degraded. Such battery packs 12-1, 12-2 and 12-3 are obtained and then the battery units 40 are separated, tested, graded and matched into sets having acceptable and compatible performance characteristics. In the example shown, battery units 40 from the three battery packs 12-1, 12-2 and 12-3 have been graded and matched into two sets 50-1 and 50-2. However, it should be understood that more sets can be used. Also, it should be understood that battery units 40 that have unacceptable performance characteristics may be discarded and/or recycled to recover the materials within the battery units 40.

The battery units 40 within the sets 50-1 and 50-2 having acceptable performance characteristics can then be formed into replacement battery packs 54-1 and 54-2 and supplied as a replacement for the battery pack 12 within the vehicle 10. Alternatively, the matching battery units 40 within each set 50-1 and 50-2 can be combined and supplied as a reconditioned battery pack for other purposes.

In some embodiments, this permits the battery units 40 within the battery packs 12 from multiple different vehicles 10 to be recycled and/or repurposed without physically altering (other than charging/discharging the battery units 40), adding or removing materials (including any additional electrolyte), or otherwise modifying the battery units 40. For example, in some embodiments, the presently disclosed methodology forms replacement battery packs 54-1 and 54-2 without forming a hole through the housing or adding any additional electrolyte. In addition, grading and matching battery units 40 in the manner disclosed herein enables the battery pack 12 (that has been determined to be degraded) to be replaced at a low cost with the replacement battery pack 54. In order to achieve low cost replacement of the battery pack 12, one or more battery packs 12 are collected from a market (e.g., automobile dealerships) subsequent to the one or more battery packs 12 being judged as degraded. The battery units 40 within the battery packs 12 are separated. Then, each of the battery units 40 is tested, e.g., during a single discharge cycle, to obtain battery operating data indicative of variable voltage and variable current discharge characteristics over time for the battery unit 40 being tested. The battery operating data can be obtained when the battery unit 40 is being charged or discharged, but in one embodiment, the battery operating data is obtained during a single discharge cycle from fully charged to fully discharged. Obtaining the battery operating data during a single discharge cycle greatly reduces the time and cost of obtaining the battery operating data as compared to obtaining the battery operating data during a charge/discharge cycle, or multiple discharge cycles.

The battery operating data for the battery unit 40 is transformed into scaled operating data by scaling the voltage variable as if the voltage variable had been generated by a constant current. Battery units 40 are then matched based on the scaled operating data being within predetermined value(s) to form a set of battery units 40 having compatible performance characteristics. The predetermined values can be based on the type of variable characterizing the performance of the battery units 40. For example, a capacity of the battery units 40 can be calculated, and then the battery units 40 can be matched together and used to form the replacement battery pack 54 having battery units 40 with capacities within a range from 0.25 Ah to 1 Ah of each other and depending upon the capacity of the replacement battery pack 54 or other battery pack to be constructed with the battery units 40. For example, for replacement battery packs 54 having a capacity of at least 70% of the original rated capacity of the battery pack 12, it has been found that battery units 40 having a capacity within 1 Ah to each other are acceptable. For replacement battery packs 54 (or battery packs used for other than the original purpose) having a capacity of less than 70% of the original rated capacity of the battery pack 12, it has been found that battery units 40 having a capacity within 0.25 Ah to each other are acceptable. The size of the predetermined value, can also be affected by the calculation of other variables. With respect to resistance, it has been found that battery units 40 having an internal resistance within a range from 1 to 30 milliohms can be matched together, and battery units 40 having an internal resistance within a range from 30 to 75 milliohms can be matched together. With respect to voltage, it has been found that battery units 40 having a voltage between 7.4 to 7.6 volts can be matched together, and battery units 40 having a voltage between 7.1 to 7.4 volts can be matched together. With respect to mean squared error (as discussed below), it has been found that battery units 40 having a value less than 250 can be matched together.

Thereafter, the replacement battery pack 54 (or battery pack for another purpose) is formed by connecting positive terminals 42 and negative terminals 44 of the battery units 40 within the set 50-1 using bus bars, for example. The replacement battery pack 54 is then supplied to the market for installation within the vehicle 10.

Figure 4A:
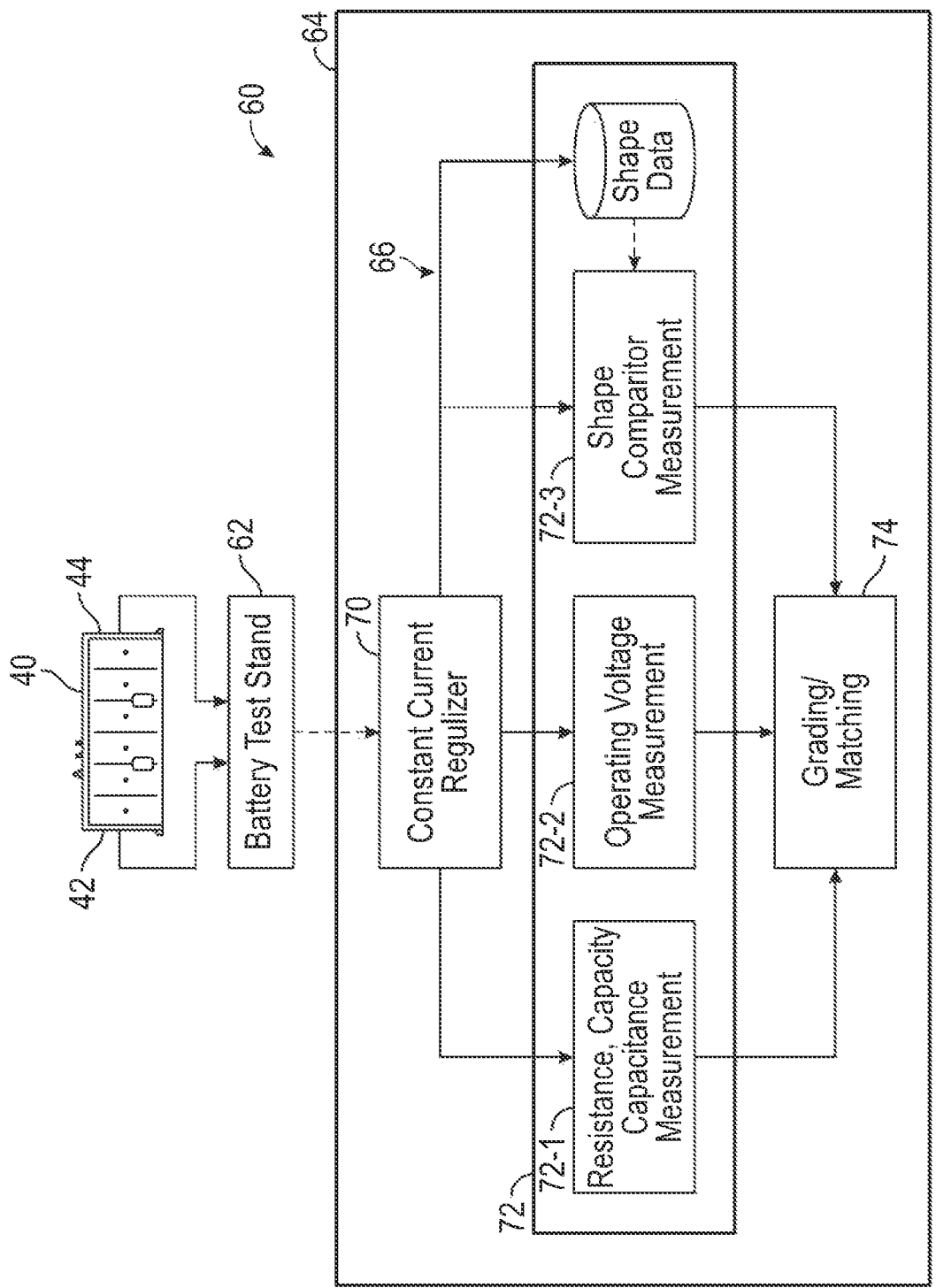
FIG. 4A is a process diagram showing an exemplary embodiment of a battery unit grading and matching system constructed in accordance with the present disclosure.

Shown in FIG. 4A is a process diagram showing an exemplary embodiment of a battery unit grading and matching system 60 constructed in accordance with the present disclosure. The battery unit grading and matching system 60 is provided with a battery test stand 62, and a grading and matching computer system 64 executing grading and matching logic 66.

The grading and matching computer system 64 may include at least one processor operably coupled with a non-transitory memory storing the grading and matching logic 66. The grading and matching computer system 64 may also include at least one I/O port for communicating with the battery test stand 62, an input device (e.g., mouse, keyboard or the like), and an output device (network connection, printer or the like). The processor may be implemented as a single processor or multiple processors working together to execute the logic and/or processor executable code described herein. Exemplary embodiments of the processor include a digital signal processor (DSP), a central processing unit (CPU), a field programmable gate array (FPGA), a microprocessor, a multi-core processor, and combinations thereof. The processor is capable of communicating with the memory via a path which can be implemented as a data bus, for example. The processor is capable of communicating with the input device and the output device via paths including one or more data busses, for example. The processor may communicate with the I/O port via a path, which may be a data bus. It is to be understood that in certain embodiments using more than one processor, the one or more processors may be located remotely from one another, located in the same location, or comprising a unitary multi-core processor. The processor is capable of reading and/or executing processor executable code and/or of creating, manipulating, altering, and storing data structures into the memory.

The memory stores data and processor executable code in the form of software and/or firmware, which includes processor executable code written in any suitable programming language, such as C++. The memory may be implemented as any non-transitory computer-readable medium, such as random access memory (RAM), a CD-ROM, a hard drive, a solid state drive, a flash drive, a memory card, a DVD-ROM, a floppy disk, an optical drive, and combinations thereof, for example. While the memory can be located in the same physical location as the processor, the memory may be located remotely from the processor and may communicate with the processor via the I/O port. Additionally, when more than one memory is used, one or more memory may be located in the same physical location as the processor, and one or more memory may be located in a remote physical location from the processor. The physical location of the memory can be varied, and the memory may be implemented as a "cloud memory" e.g., a memory which is partially, or completely based on or accessed using a network.

Figure 4B:
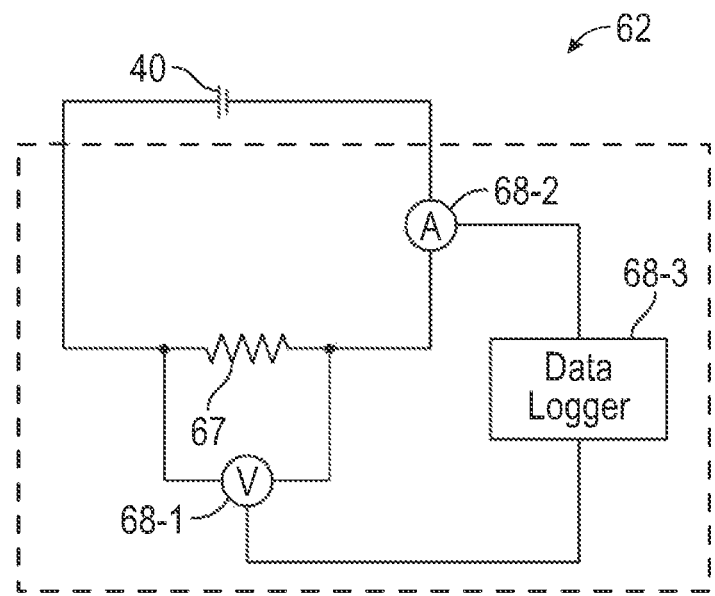
FIG. 4B is a block diagram of an exemplary embodiment of a battery test stand constructed in accordance with the present disclosure.
Figure 5:
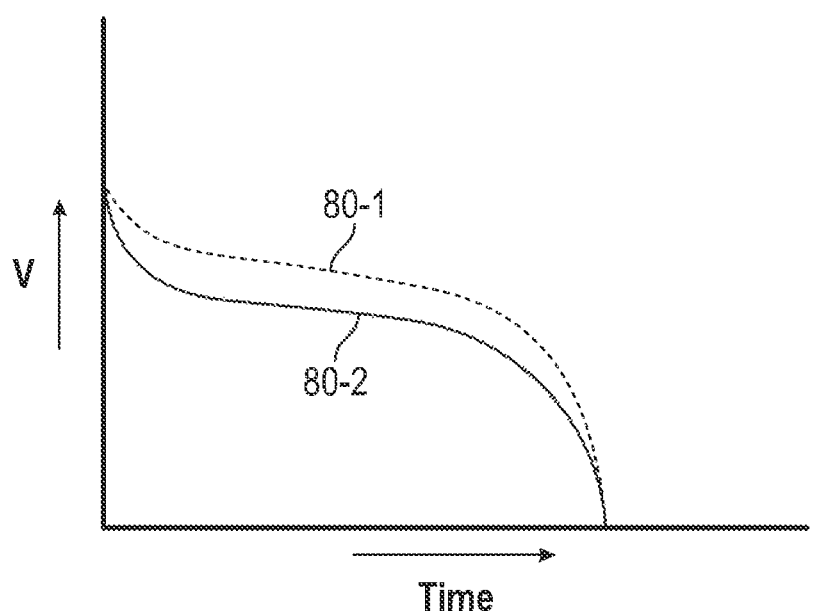
FIG. 5 is a graph of two different sets of battery operating data collected during discharge cycles of battery units in which the battery units were coupled to a load having a fixed resistance.

As shown in FIG. 4B, the battery test stand 62 may be connected to the positive terminal 42 and the negative terminal 44 of the battery unit 40 via clips (not shown) for example. In an exemplary embodiment, the battery test stand 62 includes a fixed resistance load 67 that is connected in circuit with the battery unit 40. The fixed resistance load 67 can be a resistor having a single fixed resistance, or a variable resistor in which the resistance is fixed while obtaining the battery operating data. Connecting the battery unit 40 to the fixed resistance load 67 causes the battery unit 40 to discharge stored electricity. As the battery unit 40 discharges, battery operating data indicative of (1) the current supplied to the fixed resistance load 67 and (2) the voltage of the battery unit 40 over time is collected and stored by the battery test stand 62 using a voltmeter 68-1, an ammeter 68-2 and a data logger 68-3, for example. As shown in FIG. 5, the voltage across the fixed resistance load 67 falls as the battery unit 40 is discharged. Because the load has a fixed resistance and the voltage of the battery 40 falls over time, both the voltage and the current supplied by the battery 40 are variable. The battery test stand 62 stores the battery operating data in a non-transitory computer readable medium, e.g., random access memory, and then passes the battery operating data to the grading and matching computer system 64.

The grading and matching logic 66 executed by the grading and matching computer system 64 includes a regularizer algorithm 70, one or more performance characteristic measurement algorithm 72, and a grading/matching algorithm 74. In the example shown, the grading and matching logic 66 includes three performance characteristic measurement algorithms, i.e., an electrical property measurement algorithm 72-1, an operating voltage measurement algorithm 72-2, and a shape comparitor algorithm 72-3. The output of the performance characteristic measurement algorithms 72 are fed to the grading/matching algorithm 74 which compares the outputs to predetermined performance criteria thereby grading and placing the battery units 40 into sets having similar acceptable and compatible performance characteristics. The battery unit grading and matching system 60 will be described hereinafter for grading and matching aged Nickel Metal Hydride battery units or modules that were recovered from battery packs 12 that had been previously determined to be degraded. However, it should be understood that the battery unit grading and matching system 60 can be used for grading and matching other types of battery cells or modules, including but not limited to Nickel Cadmium batteries.

In general, battery operating data including current (C) and voltage (V) data over time are gathered from the battery test stand 62 and passed to the grading and matching computer system 64. FIG. 5 is an exemplary graph of a first set of battery operating data 80-1 collected from one of the battery units 40 and a second set of battery operating data 80-2 collected from another one of the battery units 40 during a single discharge cycle of the battery units 40 when connected to the fixed resistance load 67. The battery units 40 are of the same type, i.e., Nickel Metal Hydride, but the battery operating data 80-1 and 80-2 are not the same and diverge throughout a majority of the discharge cycle.

Figure 6:
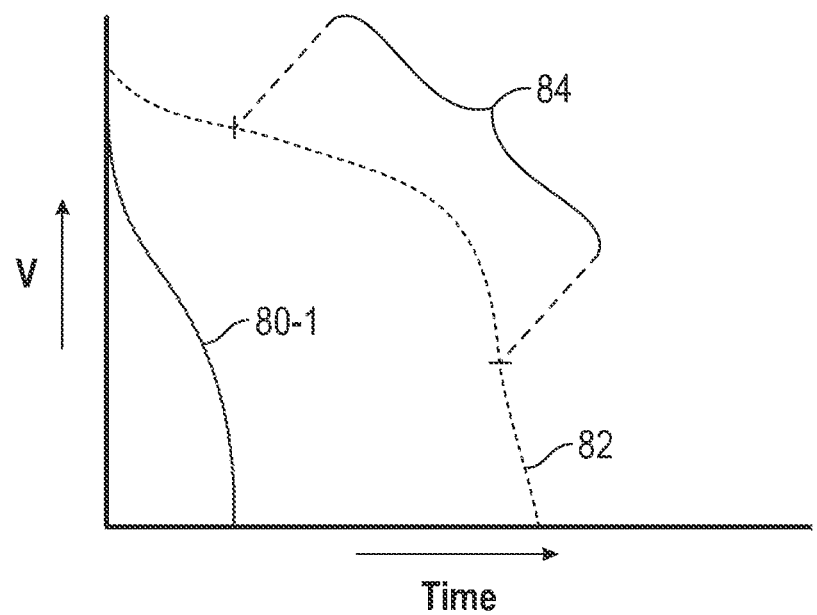
FIG. 6 is a graph of battery operating data collected during a discharge cycle of a battery unit, and regularized operating data in accordance with embodiments of the present disclosure in which the battery operating data has been transformed by simulating a constant current.

The regularizer algorithm 70 regularizes the voltage data (an example of which is shown in FIG. 5) with respect to the current so that the V curve is transformed with respect to a constant C. An exemplary regularized curve 82 based on the battery operating data 80-1 is shown in FIG. 6. Most conventional data acquisition schemes for testing batteries are time driven. In the case of the present disclosure, the battery units 40 are tested with a variable current and a variable voltage. The one constant is the resistance by which the voltage is being measured. In a scheme where constant resistance is not used, i.e., a constant current or constant voltage testing paradigm is used, the regularizer algorithm 70 is not needed. Given a time dependent series of voltages $v_t$ and $c_t$ then the regularized series can be calculated with the following ordered pairs:

$$\left(\sum_{n=1}^{t} c_n, v_t\right). \quad \text{Equation 1}$$

The support variable is the cumulative sum of the currents to the time t. In this way, the relationship between current and time is such that the voltage curve can be treated as if it has been generated with a constant current and this tends to emphasize differences between the battery operating data obtained from the battery units 40. Note that Equation 1 has an irregular support, and in order to regularize the support one can sample on a regular grid via linear interpolation, splines, or other higher order interpolation method.

From this regularized constant current curve, various electrical parameters, such as DC resistance, effective resistance, and capacity are calculated and stored by the electrical property measurement algorithm 72-1. Resistance, for example, can be the model based DC resistance, or the typical automotive effective resistance values measured at 200 ms, 6 s, 10 s, and 60 s. The capacity can be calculated using a coulomb counting technique.

The operating voltage measurement algorithm 72-2 measures the voltage at which the battery operates for the majority of the battery unit 40 discharge cycle. The operating voltage is not obtained from a single voltage measurement, but is obtained from multiple measurements obtained over time and preferably during a single discharge cycle of the battery unit 40. As shown in FIG. 6, the operating voltage can be calculated by determining an average voltage taken from a range 84 encompassing at least 51% to 100% of the regularized curve. When the range 84 is less than 100% of the regularized curve, then the range 84 may not coincide with the beginning or the ending of the regularized curve. For example, the range 84 can be a medial region of the regularized curve. The operating voltage can vary from battery unit 40 to battery unit 40. NiMH battery units 40 can have differing operating voltages, particularly after aging. Within certain applications including automative applications, it is beneficial to minimize the differences between the voltages of the battery units 40 within the replacement battery pack 54. In these instances, measurement of operating voltages of the battery units 40 are necessary when assigning the battery units 40 to particular sets for use in replacement battery packs 54 that are monitored by battery management systems.

In order to determine the operating voltage for a particular battery cell 40, a weighted average may be calculated of the voltage, where the weights are a measurement of how much the voltage is changing per unit time. This can be done discretely with raw test data, or analytically, by producing a polynomial curve for the discharge curve and then calculating the polynomial derivative. In the discrete case the operating voltage will be given as follows, if the time index t is indexed from 1 . . . T the weights are:

$$w_t = \frac{|c_t - c_{t-1}|}{\sum_{n=1}^{T} |c_n - c_{n-1}|} \quad \text{Equation 2}$$

The normalized weighting and the operating voltage can be defined as:

$$OV = \sum_{n=1}^{T} wt * vt. \quad \text{Equation 3}$$

A derivative could be calculated from a curve fit of the regularized curve 82.

Figure 7:
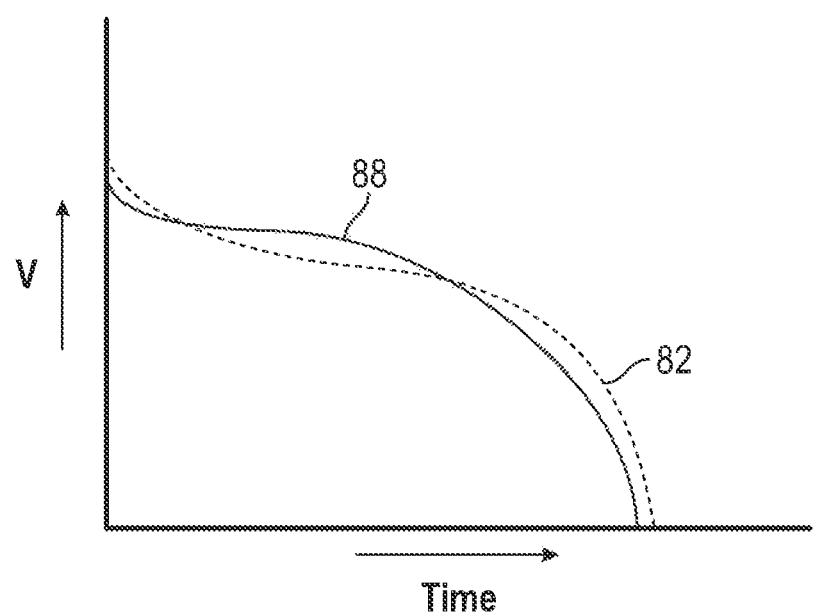
FIG. 7 is a graph of the regularized operating data being compared to a predetermined shape template in accordance with an embodiment of the present disclosure.

The shape comparitor algorithm 72-3 compares the shape of the regularized curve 82 to predetermined templates stored in a database 78 (with the templates representing and being assigned to one or more predetermined sets). Shown in FIG. 7 is a graph showing the regularized curve 82 overlayed with an exemplary template 88 that is ideal for a particular set 50. The template 88 can be represented as a capacity scaled template, a polynomial, or as a measurement of intrinsic curvature. Shape data development can be done adaptively through testing many battery units 40, or statically through an offline process. The shape comparison can be accomplished via discrete template matching, functional curve fitting, or a measurement induced on intrinsic curvature. In one embodiment, the predetermined template(s) must correspond to the theoretical electrochemical curve even if the predetermined templates are generated from measured data that corresponds well to the theoretical values.

The template 88 may be generated dynamically during testing of a battery unit 40 via a labeling mechanism that picks exemplary battery voltage profiles and integrates the battery voltage profiles "m" into the current template model, or thereafter by studying data that has already been collected. The template 88 can be a sequence of discrete values.

In this instance, the template $t_k$ can be represented as $k \in 1 \ldots T_1$. In this case there would be $T_1$ discrete values in the template. Let the regularized curve 82 to be evaluated be s k such that $k \in 1 \ldots T_2$. The length of these sequences can be different, or $T_1 \pm T_2$. Either the template 88 or the sample of the regularized curve 82 may be scaled to the length of the other, and in this instance the length of the template 88 and the regularized curve 82 will be T. Then a metric can be induced to measure the dissimilarity of the sample of the regularized curve 82 and the template 88. There is no limit to the number of usable metrics but as an example we will use Mean Squared Error (MSE), which would be:

$$MSE(s_k, t_k) = \frac{\sum_{n=1}^{T}(s_n - t_n)^2}{T}.$$ Equation 4

With respect to polynomial based matching, similar to the template matching a representative or template polynomial may be generated adaptively or off-line via a set of exemplary shapes. In this example, a similar scaling procedure would have to be undertaken to stretch the polynomials to have the same support and to clamp the ends of the polynomial appropriately. For the sample polynomial call the polynomial "s" and the template "t." A likely candidate for the polynomial will be 7th order. Then a function metric can be used. If T' now represents the domain of the two function, and if we assume that the functions are polynomials, i.e. smooth we can define T as an interval, i.e., T'=[0, T] where T is the maximal value. Then a continuous metric can be induced such as the $l_1$:

$$l_1(s, t) = \int_{T'} |s - t|$$ Equation 5

Any $L^p$ norm or its induced metric can be used in this process. $L^p$ stands for a p-dimensional Lesbesgue space.

With respect to intrinsic curvature based matching, a parameterization may need to be accomplished for the curvature of a plane curve. In the case of polynomials, one skilled in the art will understand that the support variable, usually t for time, can be set to be unitary or x=t. Then the amplitude of the voltage (V) can be given in terms of the parameter t as the sample polynomial, s, itself. Then the common curvature measurement is $$\kappa(f) = \frac{f''}{(1 + f'^2)^{(3/2)}}.$$ Equation 6

Where $f'^2$ stands for the derivative of the function $f$, and $f''$ is the second derivative of the function $f$. This type of measurement is especially useful when evaluating aged NiMH battery units 40, and especially aged NiMH battery modules. In aged NiMH modules, one of the battery units 40 in series can be subjected to cell reversal and will create extremely high curvature measurements when tested. An intrinsic based curvative matching methodology has been found to be an excellent methodology of determining that the battery modules have been subjected to cell reversal and classifying these types of battery modules.

Figure 8A:
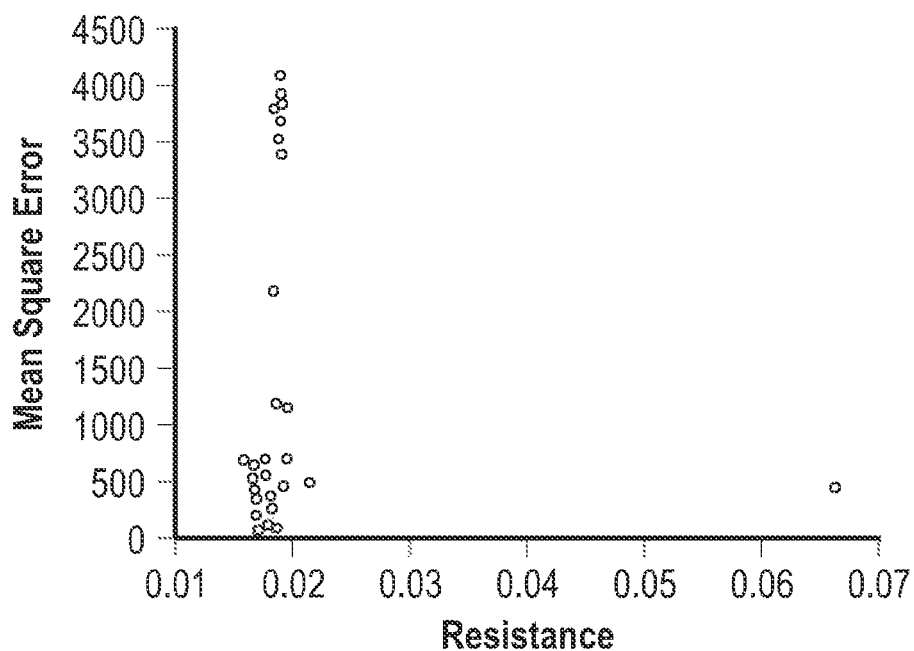
FIGS. 8(a)-8(f) are six graphs derived from battery operating voltage collected from 40 battery units with each of the battery units having 5 battery cells.
Figure 8B:
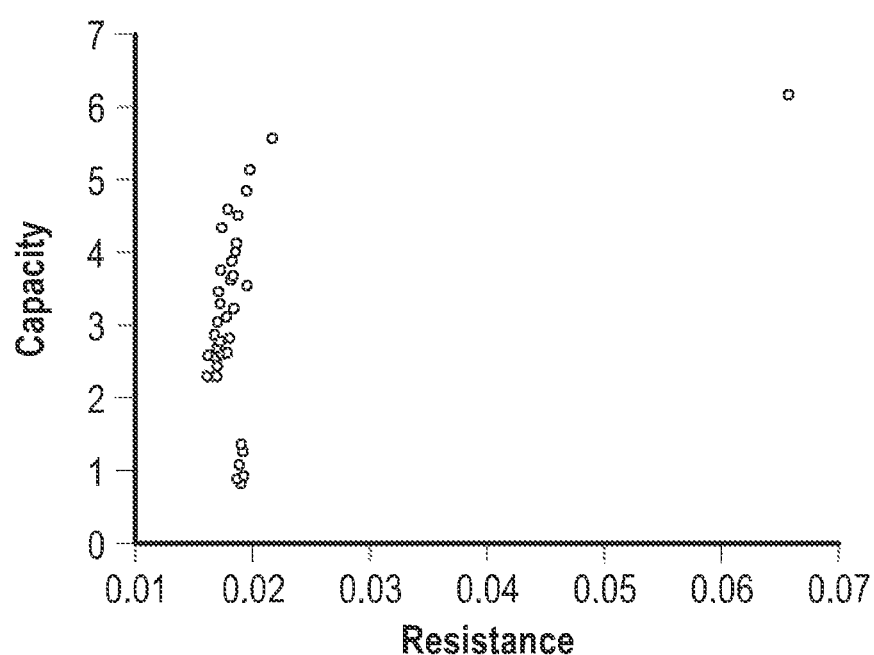
Figure 8C:
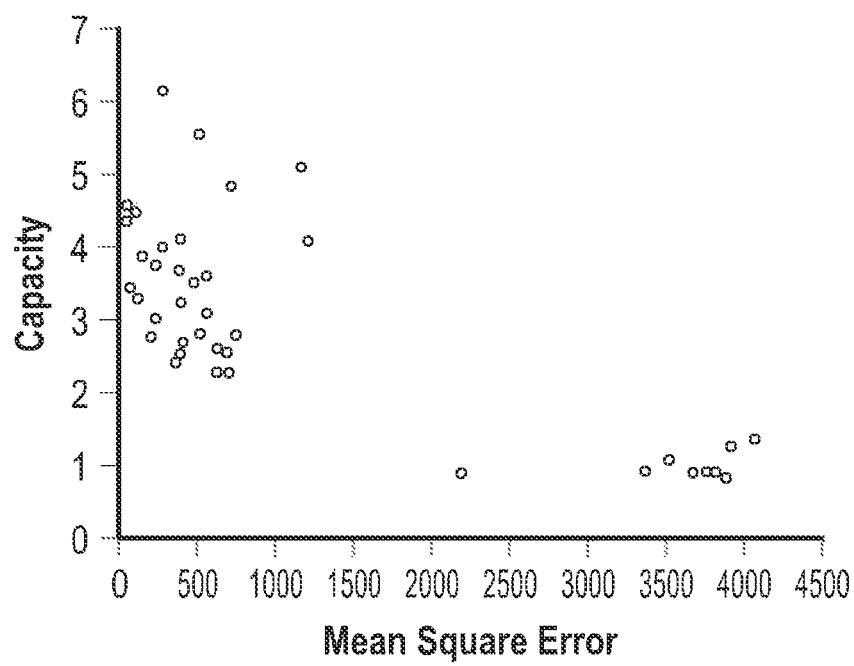
Figure 8D:
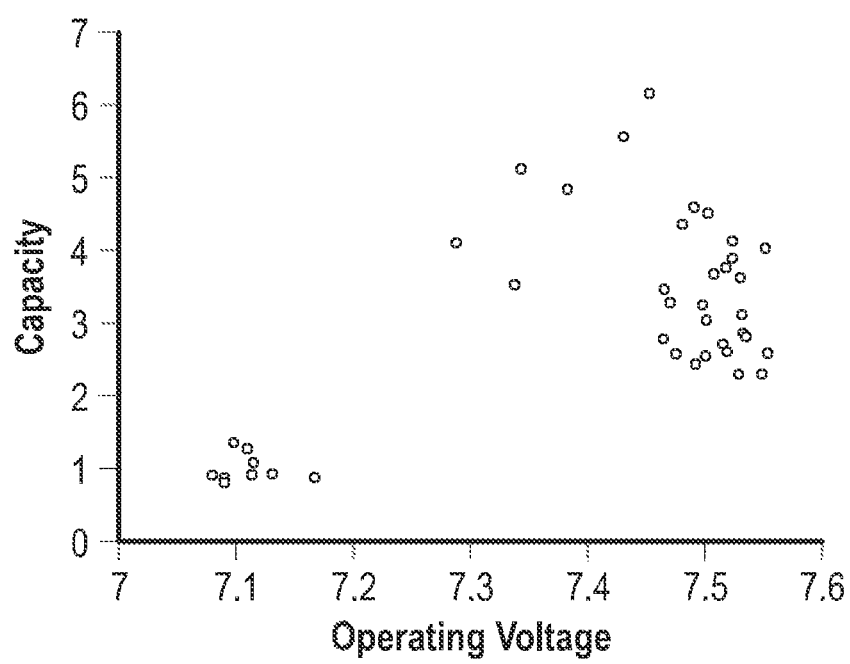
Figure 8E:
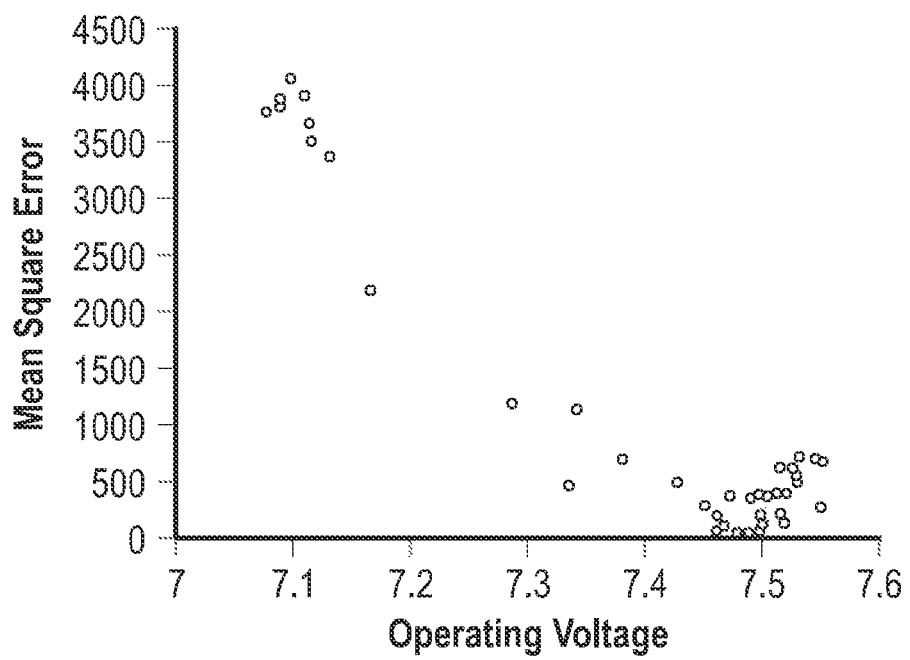
Figure 8F:
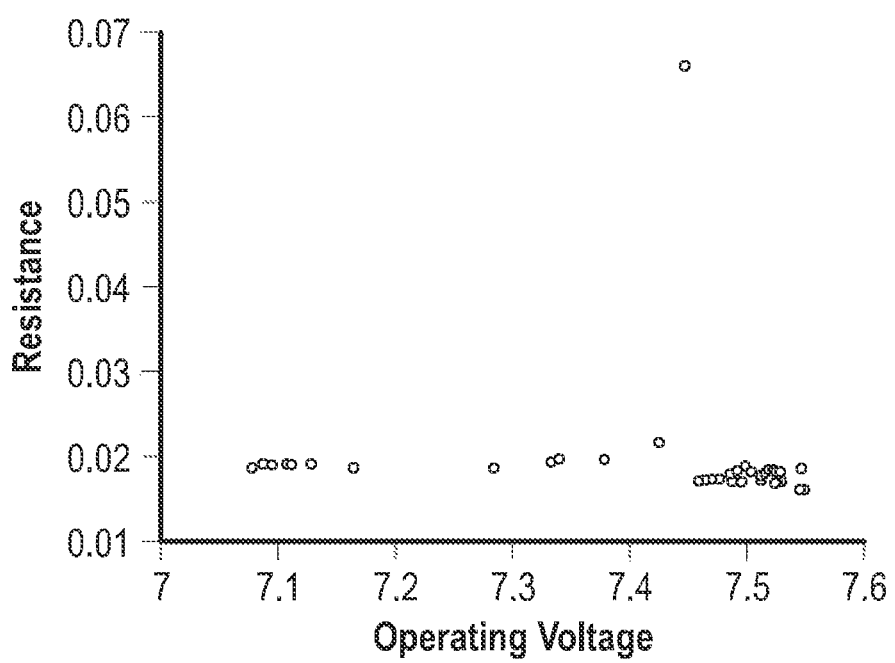

Shown in FIGS. 8(a)-8(f) are six graphs derived from battery operating voltage collected from 40 battery units 40 during single discharge cycles with each of the battery units having 5 battery cells. Resistance was measured in Ohms, capacity was measured in Ah, mean square error is a raw magnitude of similarity, operating voltage was measured in volts. FIG. 8(a) is a graph of resistance vs. mean squared error; FIG. 8(b) is a plot of resistance vs. capacity; FIG. 8(c) is a plot of mean squared error vs. capacity; FIG. 8(d) is a plot of operating voltage vs. capacity; FIG. 8(e) is a plot of operating voltage vs. mean squared error, and FIG. 8(f) is a plot of operating voltage vs. resistance. In general, there is a low correlation between each of these variables, but each plot is indicative of the operating characteristics of the battery units 40 relative to each other and each plot has a meaningful interpretation. For example, there is one outlier in FIGS. 8(a), 8(b), and 8(f) which is not apparent in FIGS. 8(c), 8(d), and 8(e). In FIGS. 8(c), 8(d), and 8(e) there are higher correlations than the other subplots. However the $R^2$ values are low enough to not mitigate their explanatory power.

These variables are significant enough and this technique will allow building battery packs from these cell/modules that in a way that will allow them to perform in a similar manner and make them controllable by a battery management system. Cells/modules with closer values of the variables behave more similarly than cells/modules with a greater distance between the variables. Setting a maximum threshold for each variable is one approach to making and using the presently disclosed grading and matching algorithm. In accordance with the presently disclosed inventive concepts, a well matched battery pack with good performance characteristics, i.e. low internal resistance and high capacity and good shape profile may last much longer than 3 years in a vehicle. A lower grade battery pack will have a much shorter lifespan. Some battery packs may not be suitable to reintroduce to an automotive environment but may be excellent for stationary applications.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A method of recycling battery packs, comprising the steps of:
   testing each of a plurality of battery units from battery packs being judged as degraded with a battery test stand to obtain battery operating data over a time period for each battery unit, the battery operating data over the time period having a shape;
   matching battery units based on the shape of the battery operating data over the time period for each battery unit compared to predetermined templates to form sets of matching battery units.

2. The method of claim 1, wherein the battery operating data includes multiple measurements obtained during a single discharge cycle.

3. The method of claim 1, wherein the battery operating data is transformed by scaling a variable voltage with respect to a constant current, and wherein matching the plurality of battery units based on the shapes of the battery operating data is accomplished with the battery operating data that has been transformed by scaling the variable voltage with respect to the constant current.

4. The method of claim 1, wherein the plurality of battery units are matched based on an item selected from a group of items consisting of capacities of the plurality of battery units, and operating voltages of the plurality of battery units.

5. The method of claim 1, wherein the method is devoid of any step that physically alters the plurality of battery units other than charging/discharging the plurality of battery units.

6. The method of claim 1, wherein the plurality of battery units have a positive active material, a negative active material and an electrolyte, and wherein the method is devoid of any step that adds any additional electrolyte to the plurality of battery units.

7. The method of claim 1, wherein each of the plurality of battery units have a housing containing an electrolyte, and wherein the method is devoid of any step that alters the plurality of battery units by forming a hole through the housing or adding any additional electrolyte.

8. A method, comprising the steps of:
testing battery units from a battery pack being judged as degraded with a battery test stand;
matching battery units based on shapes of the battery operating data over time compared to predetermined templates to form sets of matching battery units.

9. The method of claim 8, wherein the battery operating data includes multiple measurements obtained during a single discharge cycle.

10. The method of claim 8, wherein the battery operating data is transformed by scaling a variable voltage with respect to a constant current, and wherein matching the battery units based on the shapes of the battery operating data is accomplished with the battery operating data that has been transformed by scaling the variable voltage with respect to the constant current.

11. The method of claim 8, wherein the battery units are matched based on an item selected from a group of items consisting of capacities of the battery units, and operating voltages of the battery units.

12. The method of claim 8, wherein the method is devoid of any step that physically alters the battery units other than charging/discharging the battery units.

13. The method of claim 8, wherein the battery units have a positive active material, a negative active material and an electrolyte, and wherein the method is devoid of any step that adds any additional electrolyte to the battery units.

14. The method of claim 8, wherein each battery unit has a housing containing an electrolyte, and wherein the method is devoid of any step that alters the battery units by forming a hole through the housing or adding any additional electrolyte.

* * * * *

UNITED STATES PATENT AND TRADEMARK OFFICE
CERTIFICATE OF CORRECTION

PATENT NO. : 12,463,258 B2  
APPLICATION NO. : 18/452873  
DATED : November 4, 2025  
INVENTOR(S) : John Junger and Bryan Schultz Page 1 of 1

It is certified that error appears in the above-identified patent and that said Letters Patent is hereby corrected as shown below:

In the Specification

Column 5, Line 50: Delete "DC/DCconverter" and replace with -- DC/DC converter --

Column 5, Line 65: Delete "SMR-Pand" and replace with -- SMR-P and --

Column 6, Line 7: Delete "SMR-Pwhile" and replace with -- SMR-P while --

Column 13, Line 4: After "be" delete "s k" and replace with -- $s_k$ --

Signed and Sealed this  
Thirteenth Day of January, 2026

John A. Squires  
*Director of the United States Patent and Trademark Office*